United States Patent [19]

Jackson, Jr. et al.

[11] Patent Number: 4,554,344

[45] Date of Patent: Nov. 19, 1985

[54] PROCESS FOR PREPARATION OF POLYESTERS WITH IMPROVED MOLECULAR WEIGHT FROM GLYCOLS CONTAINING A VICINAL SECONDARY HYDROXYL GROUP

[75] Inventors: Winston J. Jackson, Jr.; Joseph J. Watkins, both of Kingsport, Tenn.

[73] Assignee: Eastman Kodak Company, Rochester, N.Y.

[21] Appl. No.: 722,583

[22] Filed: Apr. 12, 1985

[51] Int. Cl.$^4$ .................................................. C08G 63/34
[52] U.S. Cl. ..................................................... 528/283
[58] Field of Search ........................................ 528/283

[56] References Cited

U.S. PATENT DOCUMENTS

| | | | |
|---|---|---|---|
| 3,057,824 | 10/1962 | LeBras et al. | 528/283 |
| 3,162,616 | 12/1964 | Dombrow et al. | 528/302 X |
| 3,796,691 | 3/1974 | Chimura et al. | 528/302 X |

*Primary Examiner*—Lucille M. Phynes
*Attorney, Agent, or Firm*—J. Frederick Thomsen; William P. Heath

[57] ABSTRACT

Disclosed is a process for the preparation of polyesters from aromatic dicarboxylic acids or derivatives thereof and diols containing vicinal hydroxyl groups at least one of which is secondary. The use of a tin catalyst results in the formation of polyesters having I.V.'s of at least about 0.4 when the diol has two secondary hydroxyl groups and at least about 0.7 when the diol has only one secondary hydroxyl group.

2 Claims, No Drawings

PROCESS FOR PREPARATION OF POLYESTERS WITH IMPROVED MOLECULAR WEIGHT FROM GLYCOLS CONTAINING A VICINAL SECONDARY HYDROXYL GROUP

DESCRIPTION

This invention relates to a process for the preparation of polyesters and, more particularly, to a process for the preparation of polyesters from aromatic dicarboxylic acids and diols containing vicinal hydroxyl groups, at least one of which is secondary.

The literature contains many references to processes for preparing polyesters derived from aromatic dicarboxylic acids or their polyester-forming analogs and diols containing vicinal hydroxyl groups ("vincinal diols") wherein at least one hydroxyl group is secondary. These known polyesters typically are of relatively low molecular weight which severely limits their usefulness in the manufacture of molded articles, fibers, coatings and other shaped articles. The disadvantageous low molecular weight of such polyesters is believed to be caused by dehydration of the secondary hydroxyl-containing vicinal diol or diol residue which results in a chain-terminating reactant or radical.

U.S. Pat. No. 4,145,218 discloses the transesterification-polycondensation of dimethyl terephthalate and 1,2-propanediol to prepare a polyester having an inherent viscosity of 0.46. When a portion of the 1,2-propanediol was replaced with 1,2-ethanediol, a polyester having an inherent viscosity of 0.62 was obtained. U.S. Pat. No. 2,502,686 discloses the preparation of low molecular weight (1000–2000) o-phthalate polyesters of 2,3-butanediol.

We have discovered that polyesters having higher molecular weights can be prepared from aromatic dicarboxylic acids and their polyester-forming analogs and vicinal diols containing at least one secondary hydroxyl group by performing the ester interchange and polycondensation reactions in the presence of high levels of tin compounds. The chemical literature pertaining to polyester synthesis discloses the use of tin as a catalyst in the self-condensation of aromatic hydroxy acids (U.S. Pat. No. 4,393,191), direct polycondensation of aromatic polyesters and direct esterification of dicarboxylic acids with alkanediols. The use of tin, among several metals, in the preparation of polyesters from dihydric phenols and aromatic dicarboxylic acids is disclosed in German Offen. No. 2,751,585. The use of tin in the preparation of polyesters by the direct esterification of alkanediols is described in Japanese Published Patent Application Nos. 79-73,897, 80-142,024 and 78-144,998.

Our invention concerns a process for the preparation of a polyester which comprises reacting and polycondensing an aromatic dicarboxylic acid or a polyester-forming derivative thereof with a vicinal diol containing at least one secondary hydroxyl group in the presence of at least about 800 ppm tin. The polyesters obtained when a dialkyl aromatic dicarboxylate is employed in our novel process are characterized by an inherent viscosity of at least 0.4 when the diol has two secondary hydroxyl groups and by an inherent viscosity of at least about 0.7 when the diol has only one secondary hydroxyl group. These inherent viscosities compare to about 0.18 and 0.55 when lower levels of tin, normal levels of other metallic catalysts or catalyst systems, or high levels of other metallic catalysts or catalyst systems are used. While aromatic dicarboxylic acids can be used in the process, the polyesters obtained have lower inherent viscosities than do those obtained from the corresponding dialkyl esters. However, the inherent viscosities of the polyesters prepared from the dicarboxylic acids according to our invention are significantly higher than those obtained when the same dicarboxylic acids are used in known processes.

The aromatic dicarboxylic acids useful in the practice of our invention typically have from 8 to about 12 carbon atoms and include, but are not limited to, terephthalic acid, isophthalic acid, 2,6-naphthalenedicarboxylic acid and chlorinated derivatives thereof such as mono- and di-chloroterephthalic acid. As is indicated above the dialkyl esters of such aromatic dicarboxylic acids, wherein each alkyl group may contain up to 8 carbon atoms, are preferred to the dicarboxylic acids for use in our novel process since polyesters having higher inherent viscosities are obtained therefrom. If desired, other dicarboxylic acids or esters thereof may be used along with one or more aromatic dicarboxylic acids. For example, up to 50 mol percent of the requisite amount of dicarboxylic acid may be an aliphatic dicarboxylic acid such as glutaric or adipic acid or a dialkyl alicyclic dicarboxylate such as dimethyl 1,4-cyclohexyldicarboxylate.

Examples of the vicinal diols which may be employed in the process include 1,2-propanediol, 1,2-and 2,3-butanediol, 1-phenyl-1,2-ethanediol, 1-cyclohexyl-1,2-ethanediol and 1,2-cyclohexanediol. Other known vicinal diols containing at least one secondary hydroxyl group can be used in our process to obtain polyesters having increased molecular weights. Other diols may be employed in conjunction with one or more vicinal diols containing at least one secondary hydroxyl group. For example, diols such as 1,2-ethanediol, 1,3-propanediol, 1,4-butanediol and 1,4-cyclohexanedimethanol may constitute up to 50 mole percent of the total amount of diol used in the process.

A wide variety of tin compounds may be used as catalysts in carrying out the process of this invention. For example, the catalyst may be an inorganic tin compound such as halides, oxides, salts and metal stannoates. Stannous and stannic chloride, stannous oxide, potassium and sodium stannate, stannous oxalate and stannous sulfate are typical inorganic compounds which may be employed. Alternatively, the catalyst may comprise one or more mono-, di-, tri- or tetraorganotin compounds. Examples of the triorganotin compounds include halides, e.g., trimethyltin chloride, tributyltin bromide and tribenzyltin chloride; oxides, e.g., tributyltin oxide; hydroxides, e.g., triphenyltin hydroxide; and carboxylate salts, e.g., tributyltin acetate and benzoate. Examples of the di- and monoorganotin compounds include halides such as butyltin trichloride, dibutyltin bromide, diphenyltin chloride; carboxylates such as butyltin trioctoate and dibutyltin diacetate, dioctoate and dilaurate; mercaptides such as dibutyltin bis(butyl mercaptide) and bis(lauryl mercaptide); and alkoxides such as dibutyltin dimethoxide. The preferred catalysts are selected from the alkylstannoic acids with butylstannoic acid being particularly preferred.

The catalytic amount of tin catalyst used can be varied substantially depending, for example, on the particular tin compound employed and on other variables such as the reaction conditions under which the process is carried out. The advantages afforded by our novel process generally may be achieved by carrying out the process in the presence of at least 800 ppm tin (as Sn). The use of less than about 600 ppm tin results in polyesters having low inherent viscosities similar to those prepared when using other catalysts. Although the upper limit on the amount of catalyst used is not critical, concentrations exceeding 10,000 ppm normally are not necessary. The preferred amount of catalyst is in the range of about 1500 to 5000 ppm. Other metallic condensation catalysts such as antimony, gallium, germanium, lead, titanium and zinc may be used in combination with one or more tin compounds in the practice of our novel process.

The process provided by our invention is carried out in the melt under an inert or nonoxidizing atmosphere using conventional polyester-forming conditions of temperature, pressure and time. For example, a mixture of the dicarboxylic acid or ester and the vicinal diol containing at least one secondary hydroxyl can be heated at a temperature in the range of about 180° to 220° C. and at atmospheric or autogenous pressure to effect the initial (trans)esterification reaction. The resulting mixture may then be converted to a polyester having a relatively high inherent viscosity by carrying out the polycondensation phase of the process at a temperature in the range of about 220° to 260° C. and under a reduced pressure of about 0.05 to 10 Torr.

Our novel process is further illustrated by the following examples.

All inherent viscosities set forth herein are determined at 25° C. in a 60/40 mixture of phenol and 1,1,2,2-tetrachloroethane at a concentration of 0.5 g/100 ml. Glass transition temperatures are determined on a Perkin-Elmer DSC-2 differential scanning calorimeter.

EXAMPLE 1

A mixture of 97.0 g (0.50 mol) dimethyl terephthalate, 114.0 g (1.50 mol) 1,2-propanediol, and 0.60 g (4,000 ppm Sn) n-butylstannoic acid ($C_4H_9SnOOH$) is placed into a 500-mL, single-necked, round-bottomed flask equipped with a stainless steel stirrer and a short distillation head with provisions for maintaining a nitrogen flow and applying vacuum. The mixture is heated under a nitrogen atmosphere with stirring at 180° C. for two hours, 185° C. for one hour, and 220° C. for one hour. A vacuum of 0.1 mm Hg is applied for 0.5 hr. at 240° C. and a very high melt viscosity, amber, transparent polyester with an I.V. of 0.71 is obtained.

EXAMPLES 2–9

The procedure described in Example 1 is used to prepare a series of polyesters from 1,2-propanediol and dimethyl terephthalate using various tin compounds as catalysts. The tin compound used to catalyze the transesterification-polycondensation, the concentration of the compound expressed as ppm Sn and the I.V. of the polyester obtained in each example is shown below.

| Ex. | Tin Compound | Level, ppm Sn | I.V. |
|---|---|---|---|
| 2 | $C_4H_9SnOOH$ | 600 | 0.49 |
| 3 | $(C_4H_9)_2Sn(OOCCH_3)_2$ | 1700 | 0.65 |
| 4 | $(C_4H_9)_2Sn(Cl)(OH)$ | 4000 | 0.66 |
| 5 | $C_4H_9Sn(Cl)_3$ | 1700 | 0.61 |
| 6 | $(C_4H_9)_2Sn(OOCC_7H_{15})_2$ | 4000 | 0.62 |
| 7 | $SnC_2O_4$ | 1700 | 0.71 |
| 8 | $Sn(OOCC_7H_{15})_2$ | 4000 | 0.68 |
| 9 | $SnCl_2$ | 4000 | 0.62 |

COMPARATIVE EXAMPLES 1–7

The procedure described in Example 1 is repeated using various metallic catalysts which have been employed previously in the preparation of polyesters. The metallic compound used in each example, the concentration of the compound expressed as ppm of metal and the I.V. of the poly(1,2-propylene terephthalate) obtained in each example is shown below. The markedly inferior results, as indicated by the lower I.V.'s obtained in the examples below established the uniqueness of the use of tin catalysts according to our invention.

The procedure described in Example 1 is repeated using various metallic catalysts. The lower I.V.'s, compared to those obtained with tin catalysts in Example 2, are apparent.

| Ex. | Catalyst | Level, ppm | I.V. | Reference |
|---|---|---|---|---|
| 1 | Gallium lactate | 4000 Ga | 0.39 | X-17910-127 |
| 2 | Germanium dioxide | 4000 Ge | 0.53 | X-17910-126 |
| 3 | Lead diacetate | 4000 Pb | 0.52 | X-17910-137 |
| 4 | Zinc diacetate | 1700 Zn | 0.41 | X-17910-147 |
| 5 | Titanium tetraisopropoxide | 500 Ti | 0.48 | X-17910-184-1 |
| 6 | Titanium tetraisopropoxide | 1000 Ti | 0.50 | X-17910-184-2 |
| 7 | Titanium tetraisopropoxide | 4000 Ti | 0.33 | X-17910-120 |

EXAMPLE 10

The procedure described in Example 1 is repeated except that the 1,2-propanediol was replaced with an equimolar amount of 1,2-butanediol. A light yellow transparent polyester with I.V. of 0.73 and Tg of 82° C. is obtained.

EXAMPLE 11

The procedure described in Example 1 is repeated except that the 1,2-propanediol was replaced with an equimolar amount of 2,3-butanediol. An amber transparent polyester with I.V. of 0.41 is recovered.

A similar I.V. is obtained when the tin concentration is increased from 4000 ppm to 8000 ppm.

EXAMPLE 12

The procedure described in Example 1 is used to prepare a copolyester of 50 mol % 2,3-butanediol and 50 mol % 1,4-cyclohexanedimethanol with dimethyl terephthalate. A light yellow transparent polyester with I.V. 0.70 is obtained.

EXAMPLE 13

The procedure described in Example 1 is used to prepare a polyester of 1,2-propanediol with terephthalic acid. An amber transparent polyester with I.V. 0.50 is obtained.

The invention has been described in detail with particular reference to preferred embodiments thereof, but it will be understood that variations and modifications can be effected within the spirit and scope of the invention.

We claim:

1. Process for the preparation of a polyester which comprises reacting and polycondensing an aromatic dicarboxylic acid or a polyester-forming derivative thereof with a diol containing vicinal hydroxyl groups wherein at least one hydroxyl group is secondary under polyester-forming conditions of temperature, pressure and time in the presence of at least 800 ppm tin.

2. Process according to claim 1 which comprises reacting dimethyl terephthalate with 1,2-propanediol, 1,2-butanediol or 2,3-butanediol in the presence of about 1500 to 5000 ppm tin.

* * * * *